United States Patent [19]
Moulton

[11] Patent Number: 5,449,575
[45] Date of Patent: Sep. 12, 1995

[54] ELECTROCHEMICAL CELL WITH MAGNESIUM ANODE PACKAGING

[76] Inventor: Russell D. Moulton, 6316 Felder Dr., San Jose, Calif. 95123

[21] Appl. No.: 102,019

[22] Filed: Aug. 4, 1993

[51] Int. Cl.⁶ .................. H01M 2/30; H01M 6/16; H01M 4/38
[52] U.S. Cl. ..................... 429/179; 429/162; 429/181; 429/192; 429/218
[58] Field of Search ............... 429/192, 127, 162, 191, 429/94, 218, 179, 181

[56] References Cited

U.S. PATENT DOCUMENTS 4,550,064  10/1985  Yen et al. ............................ 429/94
4,997,732  3/1991   Austin et al. .

OTHER PUBLICATIONS

"Discharge Characteristics of Solid-State Cells with Magnesium and Copper...," Dissanayake et al., *Journal of Power Sources*, vol. 24, No. 2, pp. 165–167, Sep. 1988.

"Applications of Multivalent Ionic Conductors to Polymeric Electrolyte..." Cherng et al., *Solid State Ionics*, vols. 28–30, Part I, pp. 857–861, Sep. 1988.

"Polymeric Electrolytes for Ambient Temperature Lithium Batteries," Farrington pp. 1–29, Sep. 1987.

*Primary Examiner*—John S. Maples
*Attorney, Agent, or Firm*—James Hsue

[57] ABSTRACT

In a magnesium battery, a magnesium foil envelope encloses a current collector, cathode layers on the current collector, and an electrolyte material separating the cathode layers from the foil envelope to form the battery. The magnesium foil envelope serves as the packaging so that no extra packaging is required. The current collector has an elongated portion which protrudes through the magnesium foil to serve as a battery terminal and the magnesium foil is sealed around the battery terminal and is electrically insulated from it by an insulating layer or adhesion layer.

11 Claims, 2 Drawing Sheets

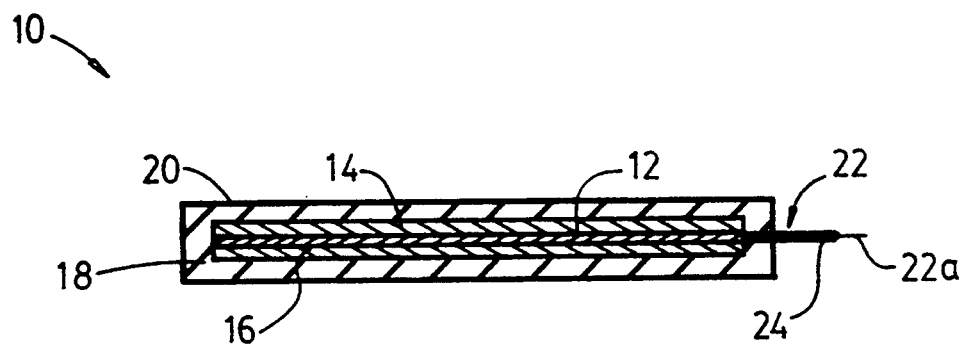
FIG._1
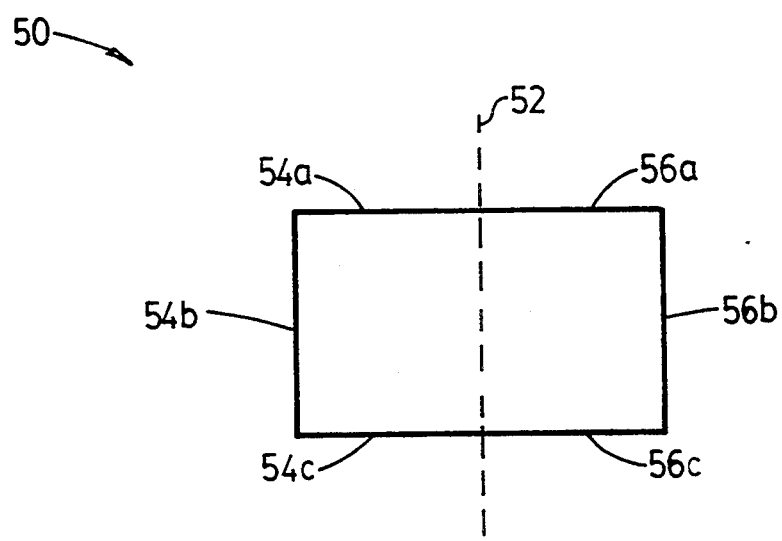
FIG._2

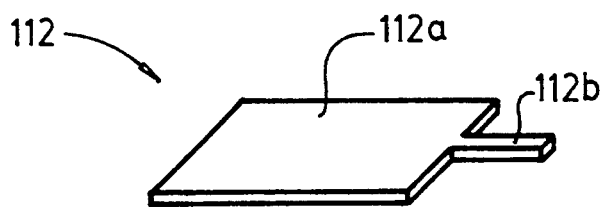
FIG._3A
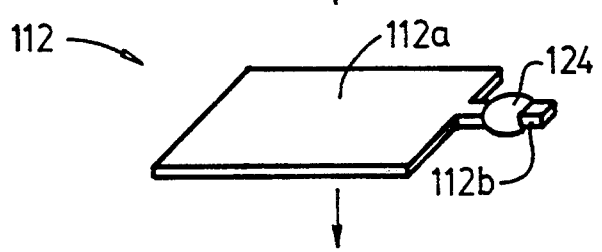
FIG._3B
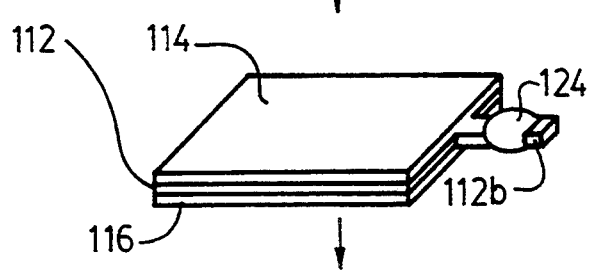
FIG._3C
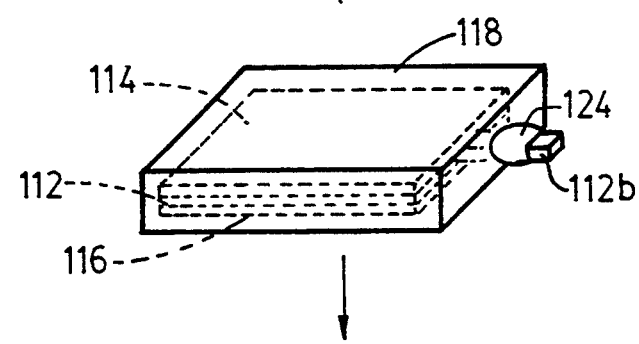
FIG._3D
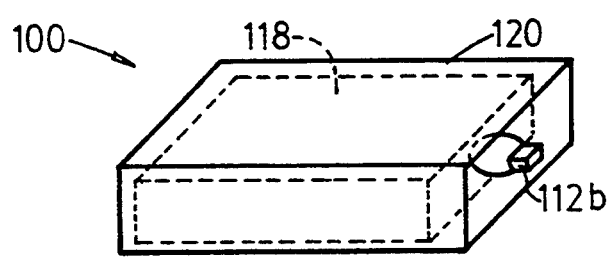
FIG._3E

ELECTROCHEMICAL CELL WITH MAGNESIUM ANODE PACKAGING

BACKGROUND OF THE INVENTION

This invention relates in general to battery assemblies and, more particularly, to a magnesium electrochemical cell using a magnesium anode as a packaging material.

With the development of portable computers and other portable devices requiring batteries, there is a high demand for lightweight thin layer solid state batteries. A common thin layer solid state battery is the lithium anode cell. A lithium anode cell typically includes a lithium anode, a transition metal oxide polymer composite cathode and a solid or liquid electrolyte which includes a dissolved lithium salt. For an example of such batteries, see U.S. Pat. No. 4,997,732 to Austin et al.

Since lithium is highly reactive in the presence of oxygen, nitrogen and moisture, the lithium anode in lithium anode cells must be sealed from the atmosphere by means of packaging material. The necessity to employ packaging material to enclose a lithium anode cell increases the thickness of the solid state batteries employing lithium anode cells. Where lightweight and compactness are especially important, as in many portable electronic devices, it is desirable to provide solid state batteries which are lighter and occupies less space than a commercially available lithium anode type solid state battery.

SUMMARY OF THE INVENTION

This invention is based on the recognition that since magnesium is stable in the presence of air and moisture, by using magnesium as the anode material, the magnesium anode may also be used as the packaging material, thereby eliminating packaging layers required for lithium anode type solid state batteries.

One aspect of the invention is directed towards a battery assembly comprising a body of cathode material, an ionically conductive electrolyte layer and an anode layer comprising magnesium metal. The anode layer encloses the body and the electrolyte layer so that the anode layer serves as packaging for the assembly, said electrolyte layer separating the body from the magnesium layer.

Another aspect of the invention is directed towards a method for assembling a battery comprising the steps of coating a current collector with a layer of cathode material, coating the cathode material with a layer of electrolyte material and enclosing the collector and layers of cathode and electrolyte materials by a magnesium foil.

BRIEF DESCRIPTION OF THE DRAWINGS

FIG. 1 is a cross-sectional view of a magnesium electrochemical cell using a magnesium anode as a packaging layer to illustrate the a first embodiment of the invention.

FIG. 2 is a schematic view of a magnesium foil to illustrate a method for making the cell of FIG. 1.

FIGS. 3A-3E are perspective views of the different components of a battery assembly to illustrate the structure of a second embodiment of the invention and its method of assembly.

DETAILED DESCRIPTION OF THE PREFERRED EMBODIMENT

FIG. 1 is a cross-sectional view of a battery assembly to illustrate a first embodiment of the invention. As shown in FIG. 1, cell 10 includes a current collector 12 and two composite cathode layers 14, 16, one on each side of the current collector. Cell 10 further includes an electrolyte layer 18 surrounding the two cathode layers and the collector and a magnesium foil envelope 20 enclosing the entire assembly including the current collector (except for a portion acting as a terminal as described below), the cathode layers and the electrolyte layer to shield and protect the components enclosed from the environment. Preferably the foil totally encloses the assembly. Therefore foil 20 is a packaging layer serving the function of an inert outside cover in a lithium anode cell.

The magnesium foil envelope 20 also acts as the anode of the battery. The electrolyte layer 18 separates the cathode layers 14, 16 from the anode layer 20. Since the magnesium foil envelope also acts as the outside packaging layer for cell 10, the cell does not require a separate terminal element for the anode. Current collector 12 is connected to or forms a unitary body with an elongated metal conductor 22 in the shape of a wire or ribbon, which passes through the electrolyte layer and the magnesium foil envelope 20 and has a portion 22a outside envelope 20 so that the outside portion 22a of the metal conductor may be connected to electrical circuits to supply power to such circuits.

Metal conductor 22 is coated with an insulating coating 24 so as to electrically insulate the metal conductor from the electrolyte 18 and from the magnesium foil 20. In other words, metal conductor 22 protrudes through an opening in the magnesium foil 20 and insulating layer 24 surrounds the metal conductor at such opening and insulates the metal conductor from the foil 20 and from electrolyte layer 18. In order to seal the magnesium foil envelope 20 around the metal conductor, foil envelope at the opening is crimped onto the insulating layer 24. Alternatively, a sealing process such as ultrasonic welding may be used to seal the connection between the magnesium foil envelope 20 and the insulating layer 24.

Ultrasonic welding is preferable where the foil envelope 20 is formed by folding a flat sheet of foil 50 about a line 52 that divides foil 50 into two equal halves as shown in FIG. 2 so that edges 54a, 54b, 54c would overlap corresponding edges 56a, 56b, 56c respectively. The corresponding pairs of edges 54a-56a, 54b-56b, 54c-56c are welded together by ultrasonic welding; in such event, one would simply also weld the foil at the opening to the insulating layer 24 during the same operation for forming the envelope by ultrasonic welding.

The sealing step is preferably performed when the entire assembly is placed in a vacuum chamber (not shown) which is evacuated during the process; such operation is known to those skilled in the art and will not be described in detail here.

FIGS. 3A-3D are perspective views of different components of a battery assembly 100 to illustrate a second embodiment of the invention; the completed assembly 100 is shown in FIG. 3E. FIGS. 3A-3E also illustrate a method for making assembly 100.

FIG. 3A is a perspective view of a current collector 112 comprising a main body portion 112a and elongated portion 112b which extends from one side of the main body 112a. An adhesion layer 124 is then applied or deposited around the middle portion of elongated portion 112b as shown in FIG. 3B. Cathode layers 114 and 116 are applied or deposited each on one side of the current collector 112 where the cathode layers 114 and 116 have substantially the same dimensions as the main body portion but do not cover any portion of the elongated portion 112b, as shown in FIG. 3C. The main body portion of current collector 112 and the two cathode layers 114, 116 are then enclosed by an electrolyte layer 118, which may be accomplished by applying or depositing the electrolyte material onto the surfaces of the cathode layers. A portion of the elongated portion 112b close to the main body portion 112a and a portion of the adhesion layer 124 are also enclosed by the electrolyte layer 118 as shown in FIG. 3D. For simplicity, the interfaces between the cathode layers and the current collector have been omitted in FIG. 3D. The electrolyte 118 is then enclosed by a magnesium foil envelope 120 as shown in FIG. 3E. Again for simplicity, only the outside surface of electrolyte layer 118 is shown in phantom and the cathode layers and current collector enclosed by the electrolyte have been omitted in FIG. 3E.

In order to seal the current collector cathode layers and electrolyte layer from the environment, the opening in magnesium foil envelope 120 through which portion 112b and the adhesion layers 24, 124 protrude is sealed to the adhesion layer by a curing process, a heat sealing process or by ultrasonic welding, all known to those skilled in the art. Adhesion layers 24, 124 may include an epoxy, in which case sealing is accomplished by curing. Adhesion layers 24, 124 may also include a ceramic material such as vitreous glass or a potting compound. Where adhesion layer 124 includes a thermoplastic material such as Primacor ® material from DOW Chemical Co. or Surlyn ® material from DuPont, adhesion may be achieved by a heat sealing process. As in the case of the cell 10 in FIG. 1, envelope 120 may be formed by folding a flat sheet of foil about a line and the corresponding edges are welded together by ultrasonic welding as shown in FIG. 2; in such event, one would simply also weld the foil at the opening to the adhesion layer 124 during the same operation for forming the envelope by ultrasonic welding. Curing or heat sealing may thereafter be used to seal the opening between the foil and adhesion layer 124. The battery assembly 100 shown in FIG. 3E is the result of any one of these processes. The above described sealing processes are preferably performed when the entire assembly is placed in a vacuum; such operation is known to those skilled in the art and will now be described in detail here.

In the two embodiments above, the current collector may comprise any suitable metal such as nickel, stainless steel, aluminum foil, metal-coated polymers, or electrically conductive polymeric materials such as a thin film of polyethylene terephthalate having electrodeposited thereon a layer of nickel metal. The cathode layers may comprise a composite of finely divided vanadium oxide ($V_6O_{13}$), carbon black or an electrically conductive polymer and a solid electrolyte material. The electrolyte may comprise a polymer with an appropriate ionizable magnesium salt. For example, the polymer may be a polymer host network electrolyte. Examples of such electrolytes are disclosed in:

(1) "Discharge Characteristics of Solid-state Cells with Magnesium and Copper Electrodes and Thin-film, Solid Electrolyte of Cuprous Sulphate," by Dissanayake et al., *Journal of Power Sources*, Vol. 24, No. 2, pp. 165–167, September 1988;

(2) "Applications of Multivalent Ionic Conductors to Polymeric Electrolyte Batteries," by Cherng et al., *Solid State Ionics*, Volumes 28–30 (Part I), pp. 857–861, September 1988; and (3) "Polymeric Electrolytes for Ambient Temperature Lithium Batteries," by Farrington, pp. 1–29, September 1987.

As disclosed in the article in the *Journal of Power Sources* listed above, the electrolyte used in the two embodiments may also be cuprous sulphate.

As will be evident from the description above, since the magnesium foil envelope also acts as a protective packaging layer for enclosing and preferably also sealing the contents of the battery from the environment, there is no need for a separate packaging material for enclosing the laminar battery as required in the case of the lithium battery cell. Therefore, the battery cell using the invention of this application has two fewer layers compared to conventional lithium batteries and can be made thinner than lithium batteries. Furthermore, the extra step of enclosing the laminar battery cell within the packaging material as required in lithium batteries is also eliminated. Moreover, since no lithium is used in the battery of this invention, the magnesium in the outer shell of the battery will remain stable even though it becomes exposed to the atmosphere.

While the invention has been described above by reference to various embodiments, it will be understood that different modifications and changes may be made without departing from the scope of the invention which is to be limited only by the appended claims. For example, only one cathode layer may be employed instead of two as described in the two embodiments; such and other variations are within the scope of the invention.

What is claimed is:

1. A battery assembly comprising:
   a body of cathode material;
   a cathode terminal electrically connected to said body;
   an ionically conductive electrolyte layer; and
   an anode layer comprising magnesium metal, said anode layer totally enclosing said body and said electrolyte layer except for said cathode terminal and serving as packaging for the assembly, said electrolyte layer separating said body from said magnesium layer.

2. The assembly of claim 1, further comprising a current collector, wherein said cathode body comprises one or more layers on said current collector.

3. The assembly of claim 2, wherein said current collector is connected to or forms a unitary body with said cathode terminal.

4. The assembly of claim 3, further comprising a layer of electrically insulating material isolating said cathode terminal from said anode layer.

5. The assembly of claim 4, wherein said electrically insulating material is a ceramic material.

6. The assembly of claim 5, wherein said ceramic material is a vitreous silica.

7. The assembly of claim 3, further comprising an adhesion material or potting compound separating said terminal from the anode.

8. The assembly of claim 2, wherein said current collector is a flat sheet of material.

9. The assembly of claim 1, wherein said electrolyte layer comprises an ionizable magnesium salt or cuprous sulphate.

10. The assembly of claim 1, wherein said electrolyte layer comprises a polymer.

11. The assembly of claim 1 wherein said anode layer defines an opening therein and wherein said cathode terminal extends through said electrolyte layer and said opening in said anode layer.

* * * * *